(12) United States Patent
Piett et al.

(10) Patent No.: US 8,760,290 B2
(45) Date of Patent: Jun. 24, 2014

(54) PUBLIC SAFETY ANALYSIS SYSTEM

(75) Inventors: William Todd Piett, Southborough, MA (US); Weston Moran, Merrimack, NH (US)

(73) Assignee: Rave Wireless, Inc., Framingham, MA (US)

( * ) Notice: Subject to any disclaimer, the term of this patent is extended or adjusted under 35 U.S.C. 154(b) by 471 days.

(21) Appl. No.: 13/159,621

(22) Filed: Jun. 14, 2011

(65) Prior Publication Data

US 2012/0256745 A1 Oct. 11, 2012

Related U.S. Application Data

(60) Provisional application No. 61/473,363, filed on Apr. 8, 2011, provisional application No. 61/474,068, filed on Apr. 11, 2011.

(51) Int. Cl.
*G08B 21/00* (2006.01)

(52) U.S. Cl.
USPC .......................... 340/540; 379/45; 455/404.1

(58) Field of Classification Search
CPC ..... H04M 11/04; H04W 4/22; H04W 76/007; G08B 25/10
USPC ............ 340/540, 573.1, 584, 539.18, 539.22, 340/539.26; 455/404.1, 404.2; 379/45, 42, 379/43
See application file for complete search history.

(56) References Cited

U.S. PATENT DOCUMENTS

2009/0322521 A1* 12/2009 Jacobson ...................... 340/540
2010/0231714 A1* 9/2010 Flores et al. .................... 379/45
2012/0233246 A1* 9/2012 Guemez ........................ 709/203

* cited by examiner

*Primary Examiner* — Thomas Mullen
(74) *Attorney, Agent, or Firm* — Occhiuti & Rohlicek LLP

(57) ABSTRACT

A computer-implemented method includes evaluating, using an analysis module of a public safety analysis system, user-generated content associated with at least one content source; identifying, using the analysis module of the public safety analysis system, a putative public safety incident based at least in part on the evaluation of the user-generated content; and providing, using an output module of the public safety analysis system, a representation of the putative public safety incident to a client of the public safety analysis system.

43 Claims, 5 Drawing Sheets

| Timeline | 02/28/11 | 11:25 AM | to | 02/28/11 | 11:27 AM | Replay | | ✉ Email | 🖨 Print |
|---|---|---|---|---|---|---|---|---|---|

| Type | Location | Time | Unit | Notes | Media |
|---|---|---|---|---|---|
| 📱 | 1023 Pleasant St, Apt 5 | 2 min ago | None | 3 Alarm fire. Apartment unit. | |
| 🔥 | 456 Pine Hill Rd | 2 min ago | None | Fire in apartment unit. | 📷 |
| ☠ | 123 Axis St | 1 min ago | None | Fatality reported in apt unit due to fire | |
| ▷ | 23 Edgil Rd | 15 mins ago | On Scene | Traffic violation | 📷 |
| 🐦 | +42° 17' 32.26", -71° 25' 38.79" | 1 min ago | @thetamster | #911 Fire across the street at 456 Pine Hill Rd | |
| 🐦 | +42° 17' 32.26", -71° 25' 38.79" | 1 min ago | @thetamster | #911 Big fire at Apts across street, explosion 5 burnt bodies | |
| 🐦 | +42° 17' 32.26", -71° 25' 38.79" | 2 mins ago | @bobthepedestrian | @911 Flames coming out of roof at 456 Pine | |
| 🐦 | +42° 17' 32.26", -71° 25' 38.79" | 1 min ago | @bikeman3 | @911 check out the campfire next door, sounded like a fire... | 📷 |
| 🐦 | +42° 17' 32.26", -71° 25' 38.79" | 3 mins ago | @girlpwrs | Someone contact #911, lots of bleeding people at 456 Pine | |

FIG. 4B

PUBLIC SAFETY ANALYSIS SYSTEM

CROSS-REFERENCE TO RELATED APPLICATIONS

This application claims the benefit of the priority date of U.S. Provisional Application Ser. No. 61/473,363, filed Apr. 8, 2011, and entitled "Public Safety Analytical Engine," and the benefit of the priority date of U.S. Provisional Application Ser. No. 61/474,068, filed Apr. 11, 2011, and entitled "Public Safety Analytical Engine," the contents of both of which are incorporated herein by reference.

BACKGROUND

A wide variety of data sources contain data relevant to public safety, ranging from weather and traffic updates to the locations of hazardous waste disposal sites, toxic or flammable chemical storage sites, and surveillance cameras. Such information can be processed and evaluated to yield valuable information about public safety. For instance, dispatches of first responders can be displayed on a map to enable the visualization of areas in which crime may be a problem. As another example, a video camera trigger may review surveillance footage in real time to detect any extraordinary situation occurring at the entrance to a nuclear power plant.

Social networking sites, such as TWITTER® and FACEBOOK®, also contain valuable public-safety information. Some emergency notification systems push emergency alert messages to social networking sites, enabling the rapid and pervasive dissemination of the alert message. Individuals often post observations of public-safety situations, such as a photograph of a car crash or a comment about a burning building.

Predictive analytics, which analyzes current and/or historical data to predict the occurrence of events, is used in many industries, such as insurance, retail and marketing, and healthcare. In the public-safety realm, dispatch data, 9-1-1 call data, and telemetry data from first responders can be evaluated to identify the possible existence of a public-safety incident.

SUMMARY

In a general aspect, a computer-implemented method includes evaluating, using an analysis module of a public-safety analysis system, user-generated content associated with at least one content source; identifying, using the analysis module of the public-safety analysis system, a putative public-safety incident based at least in part on the evaluation of the user-generated content; and providing, using an output module of the public-safety analysis system, a representation of the putative public-safety incident to a client of the public-safety analysis system.

Embodiments may include one or more of the following.

The content source includes at least one of a social networking website, a software application, a blog, and a microblog. The user-generated content includes at least one of user-generated text, user-generated photographs or other images, user-generated audio content, and user-generated videos.

Evaluating the user-generated content includes identifying user-generated content associated with public safety. Identifying the putative public-safety incident includes identifying the putative public-safety incident based on the identified user-generated content.

Identifying the putative public-safety incident includes identifying the putative public-safety incident based on subject matter of the user-generated content and a location associated with the user-generated content.

The method further includes evaluating metadata associated with the user-generated content.

The method further includes evaluating public-safety data. Identifying the putative public-safety event further comprises identifying the putative public-safety incident based further in part on the evaluation of the public-safety data. The method further includes providing a representation of at least some of the public-safety data to the client of the public-safety analysis system.

The public-safety data include data associated with at least one of a source of real-time first responder dispatch data and historical first responder dispatch data. The public-safety data include data related to at least one of weather, traffic, and current events. The public-safety data include location-specific data. The public-safety data include privately accessible public-safety data.

Providing a representation of the putative public-safety incident includes displaying, on a user interface, a representation indicative of a probability that the putative public-safety incident is a true public-safety incident. Providing a representation of the putative public-safety incident includes displaying, on a user interface, a representation indicative of a severity of the putative public-safety incident.

The method further includes determining a recommended response to the putative public-safety incident.

In another general aspect, a computer-implemented method includes receiving, at an input module of a public-safety analysis system, a specification of a characteristic of a public-safety incident; evaluating, using an analysis module of the public-safety analysis system, user-generated content associated with at least one content source, including identifying at least some of the user-generated content as relevant to the public-safety incident based on a comparison between the user-generated content and the characteristic of the public-safety incident; and providing, using an output engine of the public-safety analysis engine, a representation of the public-safety incident to a client of the public-safety analysis system.

Embodiments may include one or more of the following.

The content source includes at least one of a social networking website, a software application, a blog, and a microblog.

The user-generated content includes at least one of user-generated text, user-generated photographs or other images, user-generated audio content, and user-generated videos.

The characteristic of the public-safety incident includes at least one of a location of the public-safety incident and a time of the public-safety incident. Evaluating the user-generated content includes at least one of comparing a location associated with the user-generated content and the location of the public-safety incident and comparing a time associated with the user-generated content and a time of the public-safety incident.

The characteristic of the public-safety incident includes at least one of a category of the public-safety incident and a keyword associated with the public-safety incident. Evaluating the user-generated content includes comparing a topic of the user-generated content with the category of the public-safety incident. Evaluating the user-generated content includes identifying user-generated content that includes the keyword of the public-safety incident.

The method further includes evaluating metadata associated with the user-generated content.

The method further includes evaluating public-safety data, including identifying at least some of the public-safety data as relevant to the public-safety incident. The method further includes providing a representation of at least some of the public-safety data to the client of the public safety analysis system.

The public-safety data include data associated with at least one of a source of real-time first responder dispatch data and historical first responder dispatch data. The public-safety data include data related to at least one of weather, traffic, and current events. The public-safety data include location-specific data. The public-safety data include private public-safety data.

Providing a representation of the public-safety incident includes displaying, on a user interface, a representation of at least some of the user-generated content relevant to the public-safety incident. Providing a representation of the public-safety incident includes displaying, on a user interface, a representation indicative of at least one of the severity of the public-safety incident and the predicted severity of the public-safety incident.

The method further includes determining a recommended response to the public-safety incident.

In another general aspect, a non-transitory machine-readable medium stores executable instructions for causing a machine to identify user-generated content relevant to a public-safety incident, the public-safety incident occurring at an incident location, including evaluating user-generated content associated with at least one content source, including identifying a first set of user-generated content associated with the incident location; processing the first set of user-generated content against a dictionary of public safety keywords, including identifying a second set of user-generated content, each item of user-generated content in the second set of user-generated content including at least one of the public safety keywords; for each item of user-generated content in the second set of user-generated content, determining a likelihood that the item of user-generated content is relevant to the public-safety incident based at least in part on a context of the public safety keyword; and assigning a relevance score to each item of user-generated content in the second set of user-generated content, the relevance score indicative of the likelihood that the item of user-generated content is relevant to the public-safety incident.

Embodiments may include one or more of the following.

Determining the likelihood that the item of user-generated content is relevant to the public-safety incident includes identifying negative keywords in the item of user-generated content.

The likelihood that the item of user-generated content is relevant to the public-safety incident is based at least in part on a likelihood that another item of user-generated content in the second set of user-generated content is relevant to the public-safety incident.

Determining the likelihood that the item of user-generated content is relevant to the public-safety incident includes determining a number of items of user-generated content in the second set of user-generated content that are relevant to the public-safety incident.

Determining the likelihood that the item of user-generated content is relevant to the public-safety incident includes determining a time-related characteristic of the items of user-generated content in the second set of user-generated content.

The method further includes determining a severity of the public-safety incident based on at least one a content of the items of user-generated content in the second set of user-generated content and a time-related characteristic of the items of user-generated content in the second set of user-generated content.

The method further includes forming the dictionary of public safety keywords. Forming the dictionary of public safety keywords includes identifying public safety keywords based on an analysis of a correlation between a potential keyword and a public-safety incident.

The systems and methods described herein have a number of advantages. Using analytical modeling techniques to identify trends and predictive indicators in various data sources, and then monitoring and accessing those sources in real time, it is possible to gather information that is of use to public safety officials in determining how best to address a public-safety incident. The results of an analysis can help officials discern the criticality or severity of an incident, identify the type of event, and decide what resources are necessary to respond to the event. In addition, public-safety incidents can be identified quickly, allowing for faster arrival of first responders. Evaluation of real time and historical data can help to predict where and when an event might occur, enabling proactive response and the possible prevention of an incident or the minimization of its impact.

Other features and advantages of the invention are apparent from the following description and from the claims.

BRIEF DESCRIPTION OF DRAWINGS

FIGS. 4A and 4B show an exemplary user interface displaying the results of a PSAS analysis.

DETAILED DESCRIPTION

Figure 1:
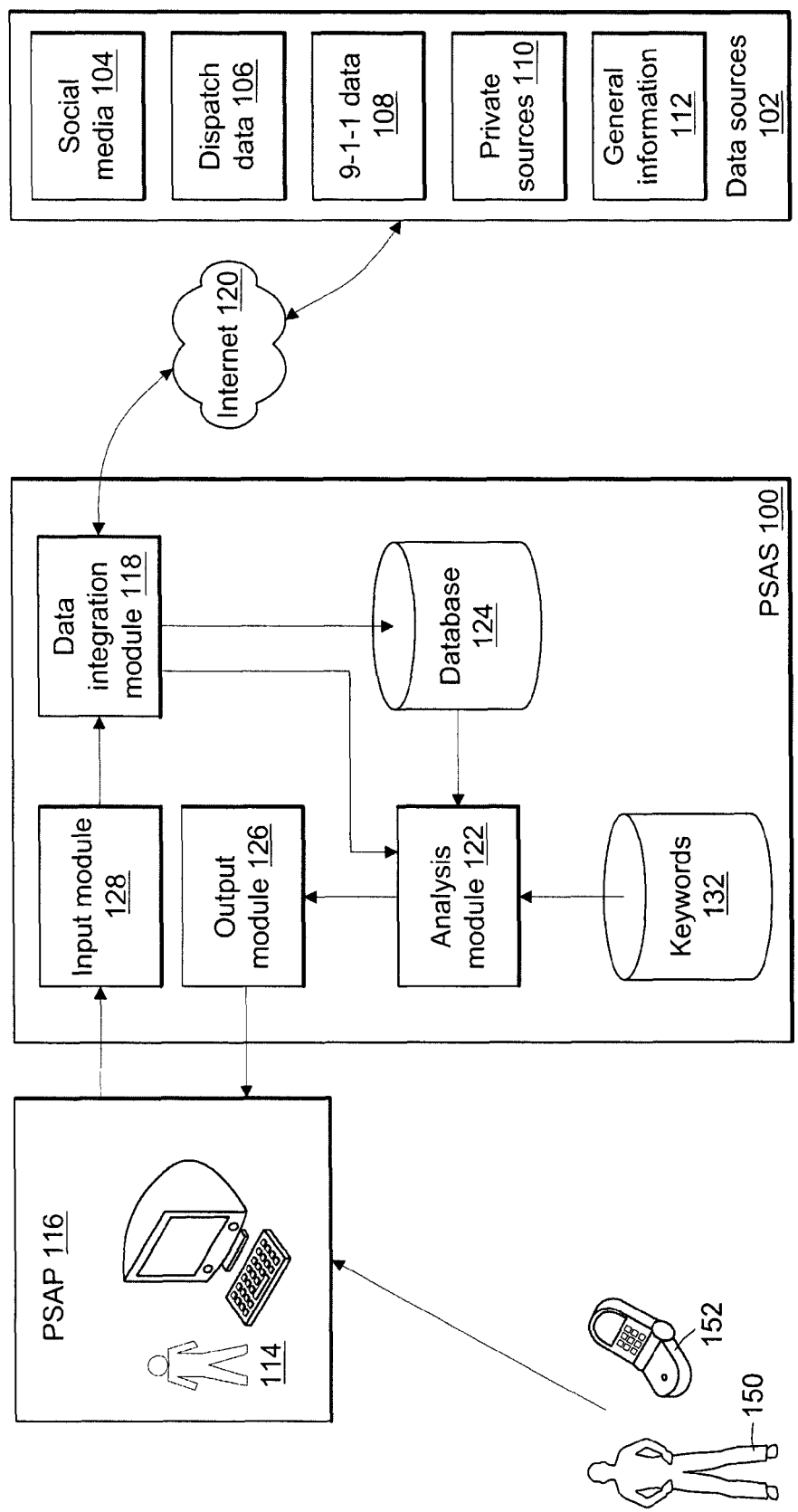
FIG. 1 is a block diagram of a public safety analysis system (PSAS).

Referring to FIG. 1, a public-safety analysis system (PSAS) 100 aggregates and processes data obtained from various third party sources 102 to identify and analyze information relevant to public safety. Third party sources 102 include, for instance, social media platforms 104, real time and/or historical dispatch data 106 and 9-1-1 call records 108, private information sources 110, and other generally accessible information 112 such as weather reports, traffic reports, and event calendars.

In one mode of operation, PSAS 100 collects information from third party sources 102 about known public-safety incidents. For instance, PSAS 100 may search social media platforms for additional data (e.g., posts including relevant descriptions or photographs) related to a 9-1-1 call regarding a reported building fire. In another mode of operation, PSAS 100 identifies trends and predictive indicators in data retrieved from third party sources 102 in order to proactively identify the occurrence of a public-safety incident. For instance, by monitoring social media sites, PSAS 100 may be able to identify that a motor vehicle accident has occurred before any 9-1-1 calls are processed related to the incident. PSAS 100 can also be used to predict more generally where and when an incident may occur, for instance based on data indicating an unusually large gathering of people.

The results of the analysis performed by PSAS 100 can be utilized by a telecommunicator 114 (e.g., a dispatcher or a call taker) at a Public Service Answering Point (PSAP) 116 or other 9-1-1 call handling entity to determine how best to respond to an incident. For instance, after receiving a 9-1-1 call from a caller 150, telecommunicator 114 queries PSAS 100 for more information about the incident reported by the caller. Alternatively, PSAS 100 is queried automatically upon receipt of a 9-1-1 call. The results of the analysis performed by PSAS 100 help telecommunicator 114 to better identify the type of incident, discern the criticality or severity of the incident, and estimate what resources are necessary to address the incident. In other embodiments, the results of the analysis performed by PSAS 100 are used by another public safety entity. For instance, a crime analysis unit in a police department may be proactively alerted to a public safety event detected or investigated by PSAS 100.

PSAS 100 includes a data integration module 118 that monitors and accesses third party sources 102 in real time via the Internet 120 and aggregates and formats the data for processing by an analysis module 122. In some cases, data integration module 118 remotely accesses the data and passes the data directly to analysis module 122. In other instances, the data is stored in a database 124. Analysis module 122 parses and analyzes the data and communicates the results of the analysis to telecommunicator 114 or PSAP 116 via an output interface 126. An input interface 128 enables PSAS 100 to receive communication from PSAP 116, such as a query for information related to an incident of interest. In some embodiments, PSAS 100 is hosted locally at PSAP 116; in other instances, PSAS 100 is remotely hosted.

In the context of this disclosure, a 9-1-1 "call" can be placed via any of a number of modes of communication including, for instance, a mobile telephone, a landline telephone, a Voice over Internet Protocol (VoIP) system, a short message service (SMS) message, an instant message (IM) system, email, or a video phone. Furthermore, as used here, a social media "post" may refer to information of any format posted to a social media source, including text, images, videos, and audio recordings.

1 Data Sources

Disparate data sources are aggregated (physically or virtually) by data integration module 118 such that analysis can be performed along any number of common dimensions, such as location, time, type of incident, source, or keywords.

1.1 Social Networking Sources

Social media sources 104 include social networking platforms, such as FACEBOOK® and TWITTER®, that allow individuals to post updates and make comments that are immediately shared with others. Social media sources 104 also include platforms such as FLICKR® and YOUTUBE® that allow users to post video and image content. In some cases, posts are "public," meaning publicly accessible; in other cases, posts are "private," meaning shared only with pre-authorized individuals.

Analysis module 112 parses and searches public social networking posts and private posts to which it has access in order to identify both individual posts and broad trends that may be relevant to public safety. When possible, analysis module 112 restricts its search to posts associated with a particular location (e.g., the coverage region of a particular PSAP or the location of a known public-safety incident). In some cases, a location is explicitly mentioned in a post or a post is geotagged with location information. When location information is not explicitly stated, PSAS 100 may be able to infer an associated location by analysis of a user profile or the content of the post. User profiles (e.g., a profile associated with a single social media platform or an aggregate profile assembled from various sources) and user posts may also be used by analysis module 112 to identify other characteristics about the user that may be useful for PSAS 100.

Metadata or other content associated with a tool used to create social networking data may also be used as a data source. For example, a social networking site may use the IP address of a computer from which a user posts an update to tag the post with a location tag. Metadata may also include the number and/or status of a user's "friends" or content posted by those friends.

1.2 Dispatch Data

Public safety agencies (e.g., PSAP 116) use tools such as Computer Aided Dispatch (CAD) systems to track the disposition of available assets (e.g., police cruiser #7 is on a traffic stop at the intersection of 5th and Main and unavailable for dispatch), log incident information (e.g., 9-1-1 caller reports difficulty breathing), and record the dispatching of resources to an incident (e.g., two police cruisers and one fire truck dispatched in response to a reported gas odor). CAD databases or Records Management Systems store a historical record of incident type, time, and location; resources dispatched; and other relevant information. PSAS 100 can use the information stored in CAD databases to identify historical outcomes of public-safety incidents (e.g., a 9-1-1 call for a fallen elderly woman resulted in two police units and one ambulance being dispatched) or as a real-time indicator of dispatch status.

1.3 9-1-1 Call Information 9-1-1 call-taking systems have access to information about the caller, including the unique phone number or other identifier of the caller (e.g., the Automatic Number Identification (ANI) or call-back number, instant messaging screen name, social networking site username, or Session Initiation Protocol (SIP) uniform resource indicator (URI)). In addition, the address or location (latitude/longitude) of the caller is generally available. In Next Generation 9-1-1 (NG9-1-1) systems, other information specific to the mode of the call is also accessible, including, for instance, the caller's IP address and Internet service provider. 9-1-1 call information can include data about the call itself (e.g., mode of communication, service provider, unique identifier, location of the caller, etc.), data about the caller (e.g., name, address, emergency contacts, medical information), data about the location of the call (e.g., 3-story residential building, landlord contact information), and data about the PSAP(s) involved in processing the call (e.g., an audit trail of PSAPs that have transferred the call, telecommunicator notes about the caller). All of these data elements can be integrated into and utilized by PSAS 100.

1.4 Private Information Sources

Public safety officials (e.g., telecommunicator 114) have access to secure, non-public data sources that can be used by PSAS 100. For instance, PSAS 100 may use the National Crime Information Center (NCIC) database to compare addresses associated with known felons to addresses associated with social networking profiles and/or posts to identify potential indicators of interest. As another example, public safety can be retrieved through the National Law Enforcement Telecommunications System (NLETS). Sex offender registries, which include work and home addresses of offenders, are another valuable data source. Databases including the location of hazardous waste disposal sites, toxic or flammable chemical storage sites, or other such sites can be useful in evaluating the potential severity of an incident. In addition, status information provided by utilities (e.g., gas or electric companies) and other public sector organizations (e.g., department of transportation or water company) can provide useful data.

Traffic cameras, surveillance cameras, emergency response vehicle telemetry data, radios, computers, and cameras mounted on emergency response vehicles or carried by first responders represent other potentially useful data sources. Each of these sources may have a level of source-specific analytics, the results of which can be another data source. For instance, video analytics can analyze raw video footage and create event notifications based on certain criteria of interest. Both the video footage itself and the resulting event notifications are sources of data for PSAS 100.

Location data itself may also be mined as a data source. For instance, the locations of smart phone subscribers, and the proximity of subscribers to one another, can be evaluated to identify large gatherings of people.

1.5 General Information

A number of other web-based data sources provide information that is relevant to public safety. Real-time traffic reports, weather updates, event schedules, news websites, and sites where citizens post photographs or event information can be indicative of both scheduled events (e.g., a baseball game) and public safety emergencies.

2 Predictive Modeling and Trend Analysis

PSAS 100 performs various types of analysis, including predictive modeling to identify event indicators based on past incidents. By analyzing historical data, a predictive model can be established that identifies data elements out of a pool of candidate data elements that are predictive indicators of public-safety incidents. For instance, modeling may determine that several TWITTER® and FACEBOOK® posts in a particular location mentioning the words "fight," "shout," or "argument" correlated with a 9-1-1 hang-up call that ultimately resulted in the dispatch of two police units for a domestic violence incident. Predictive models can be created in advance of real time implementation of PSAS 100 by processing historical data, and can then evolve and learn as new data is processed in real time.

Content (keywords, which are words or phrases that indicate content of interest; and negative keywords, which are words or phrases that, if present, indicate that the content is not likely of interest), frequency and proximity of keywords, frequency or rate of change in frequency of relevant posts, elapsed time between a first indication of an incident of interest and later relevant posts, location associated with posts, and other elements of social networking are evaluated to determine and quantify their ability to predict incidents of interest to public safety and to evaluate the severity of those incidents. Similar concepts can also be applied to data elements from other sources. Predictive modeling techniques may utilize any of a number of different algorithms, such as Bayesian, Neural Network, regression, or another type of analysis. The algorithms are generally configured to identify false indicators and to find data elements that are the strongest indicators of an event occurring.

Referring to FIG. 1, a keyword directory 132 is developed that contains words and phrases relevant to public safety. In some embodiments, keyword directory 132 is a list of relevant words and phrases. In other embodiments, keyword directory 132 is a business rules directory that includes keywords, associations between data sources, parameters for algorithms, and other information. Keyword directory 132 can be established and supplemented by processing historical and/or real time data to identify a causal relationship between specific words or phrases and public-safety incidents (e.g., the term "crash" correlates strongly with a motor vehicle accident). Alternatively, crowd-sourcing algorithms can be used to score the level of interest of various words or phrases. For instance, public safety call-takers, dispatchers, or other individuals can rank words or phrases in terms of their relevance to public safety. Depending on the content type being analyzed, "keywords" may also refer to images, audio content, video content, and other data types where commonalities can be compared and analyzed across different sources.

Analysis module 122 filters social media posts and other data against keyword directory 132 to identify relevant data. In general, by evaluating the presence of keywords and negative keywords, the frequency of posts having keywords and/or negative keywords, and the proximity of these posts to each other, the relevance of social media posts can be inferred. For instance, a post having the phrase "the roof is on fire" may be flagged as potentially relevant in isolation. However, evaluating the rest of the post and neighboring posts, the presence of negative keywords such as "band" and "download" would indicate that the series of posts is related to a song rather than a fire.

Crowd sourcing algorithms can also be used to determine whether social media posts are relevant. For instance, before public safety call takers take calls, dispatchers, or other individuals can rank posts in terms of their relevance to public safety, and can explicitly define or tag the elements of each post that make it relevant. A modeling algorithm or filter is created based on the results of this process. Alternatively, a process based on crowd-sourcing can be used in real time as a decision engine. In some embodiments, a learning model is built in which data points are collected and an incident is defined and associated with the collected data points after the incident has already occurred. The association of data points with the incident can be used to build rules for subsequent use by analysis module 122.

In addition to predictive modeling, PSAS performs exploratory data analysis to visualize historical data and identify trends. For instance, a visualization of social networking posts together with 9-1-1 call data and dispatch data may reveal a time period or neighborhood that could benefit from more frequent police patrols. Exploratory data analysis can be performed using any number of tools or techniques, such as Online Analytical Processing (OLAP) or data filtering and display on a geographic map.

3 Real-Time Data Processing

Real time processing of data against a predictive model allows PSAS 100 to predict or highlight incidents of interest and to collect and aggregate supplemental information about a known public-safety incident, incident location, or caller location. In general, PSAS 100 uses analytic, model-based approaches driven by a configurable rules-based engine to determine the relevance of data to real and/or putative public-safety incidents. Keywords, negative keywords, frequency of related social media posts, and locations associated with social media posts and other data is used to identify and aggregate individual pieces of data relevant to public safety.

In some cases, individual data elements are assigned a score indicative of their relevance to public safety in general or to a specific public-safety incident. In other cases, scores are assigned to aggregations of data, for instance data associated with a known or putative public-safety incident, representative of the likelihood or severity of the incident.

The results of a PSAS analysis are presented to a PSAP or other 9-1-1 entity, by display at a PSAP or by injection into existing 9-1-1 call handling procedures. These results can be used to guide the response of the PSAP. Each PSAP may set a different threshold of relevance, likelihood, or severity, which then governs which data or putative incidents are delivered into the 9-1-1 network.

For some data sources (e.g., some social networking sources), PSAS 100 is able to search and analyze all content through an Application Programming Interface (API) associated with the data source. Some data sources may not expose a public API. In these cases, PSAS 100 collects permissions for each user, e.g., through a registration process, allowing access to and automated search of content associated with that user.

3.1 Analysis of a Known Incident

Figure 2:
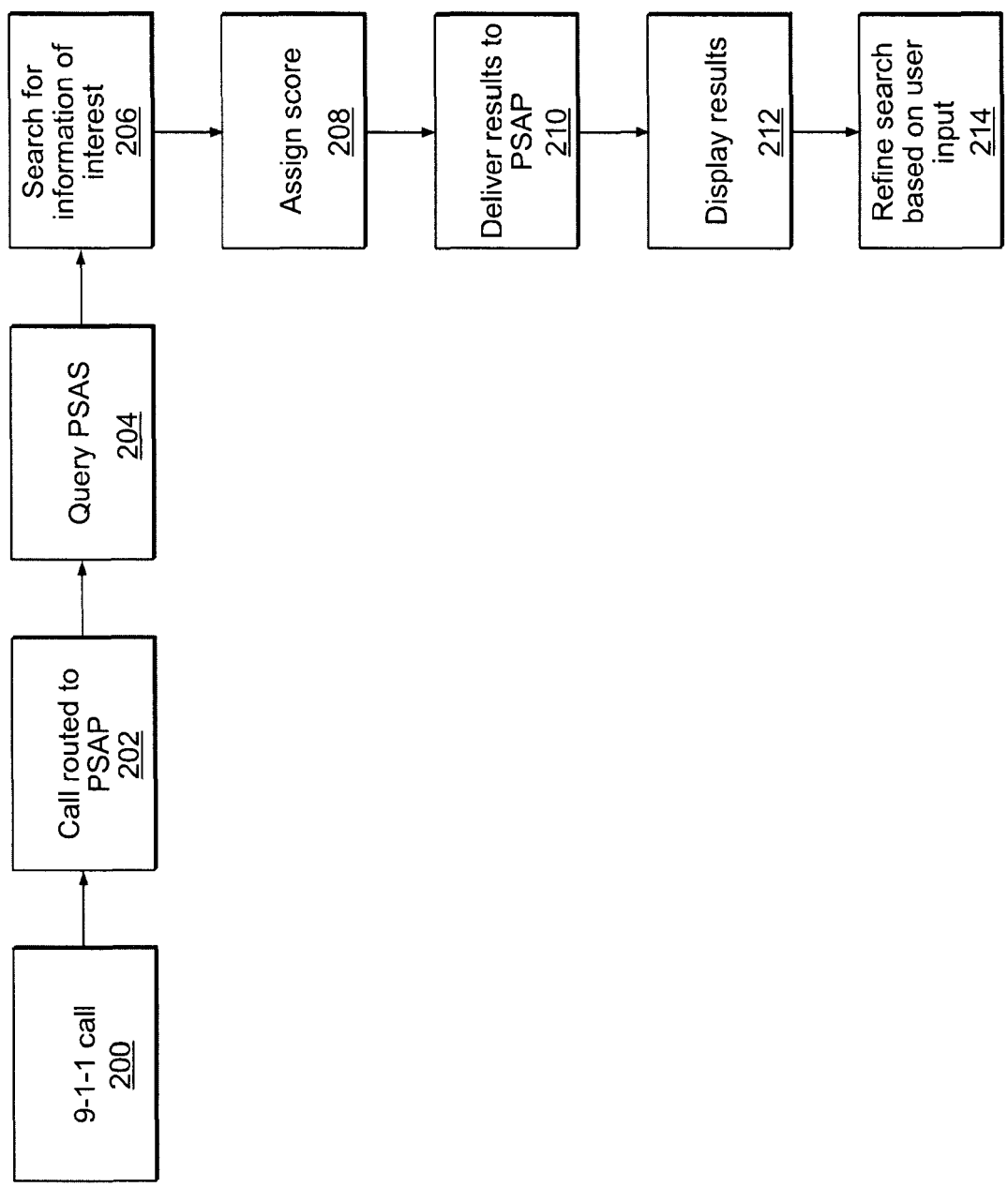
FIG. 2 is a flow chart of the use of a PSAS to aggregate information related to a known public-safety incident.

Referring to FIGS. 1 and 2, PSAS 100 identifies and aggregates social media posts and other information related to a known public-safety incident. In this mode of operation, caller 150 places a 9-1-1 call (e.g., via a mobile telephone 152) to report an emergency or to request assistance (step 200). As an example, caller 150 reports a motor vehicle accident at the intersection of Main and 5th Streets. The call is directed to the responsible PSAP 116 or other entity managing the call (e.g., emergency response service provider, 9-1-1 call-taking system, Computer Aided Dispatch (CAD) system, Geographical Information System (GIS)) along with the location, ANI, and other available information about the caller (step 202). PSAP 116 queries PSAS 100 (step 204) for additional information specifically related to the incident and/or for general descriptive information about the location of the accident.

PSAS 100 uses the location of the incident to search for information of interest from the sources of data to which it has access (step 206), using the keyword dictionary and predictive models to determine which data is potentially of value. For instance, PSAS 100 may identify photographs posted on social networking sites from the area near the accident, TWITTER® posts mentioning a car crash, and traffic data indicating slow traffic in the vicinity of the accident as relevant to the 9-1-1 call. A score is assigned to each piece of data, or aggregated set of data, based on the likelihood that it is relevant to the incident or the actual or predicted severity or risk of the incident (step 208). Results having a score higher than the threshold set by PSAP 116 are delivered to the PSAP (step 210). The results are displayed on a user interface at the PSAP (step 212), for instance, in the form of an interactive map (discussed in more detail below). Alternatively, telecommunicator 114 can access the results of the analysis on a secure website to view, refine, or manipulate the results. In some cases, PSAS 100 will refine the search based on the actions of the telecommunicator or based on ad hoc keywords entered by the telecommunicator (step 214).

Based on the results of the PSAS analysis, telecommunicator 114 can make a determination of how best to respond to the incident. For instance, a photograph of the crash may suggest that the victims are likely to have extensive injuries, and the telecommunicator can immediately dispatch emergency medical services accordingly. Similarly, traffic data indicating that traffic is not able to pass around the crash site suggests that traffic controls or a detour will need to be imposed. In some cases, the results of the PSAS analysis may be used in conjunction with or as a replacement to Emergency Medical Dispatch (EMD) cards to provide standard instructions for responding to a particular type of incident.

PSAS analyses are also applicable to larger scale incident management. For instance, a deluge of 9-1-1 calls reporting a suspected gunman at a mall results in the dispatch of many first responders potentially under the control of many agencies. Until a command post is established, the response to the incident can be chaotic and disorganized. Results returned by PSAS 100 can be used to coordinate the actions of first responders. For instance, photographs posted to social networking websites or applications can help a telecommunicator or a command post identify which police units are present in what locations in the mall.

PSAS 100 can also be used for post-incident processing of data, for instance to evaluate how the response to a public-safety incident could have been improved.

3.2 Identification of a Putative Incident

Figure 3:
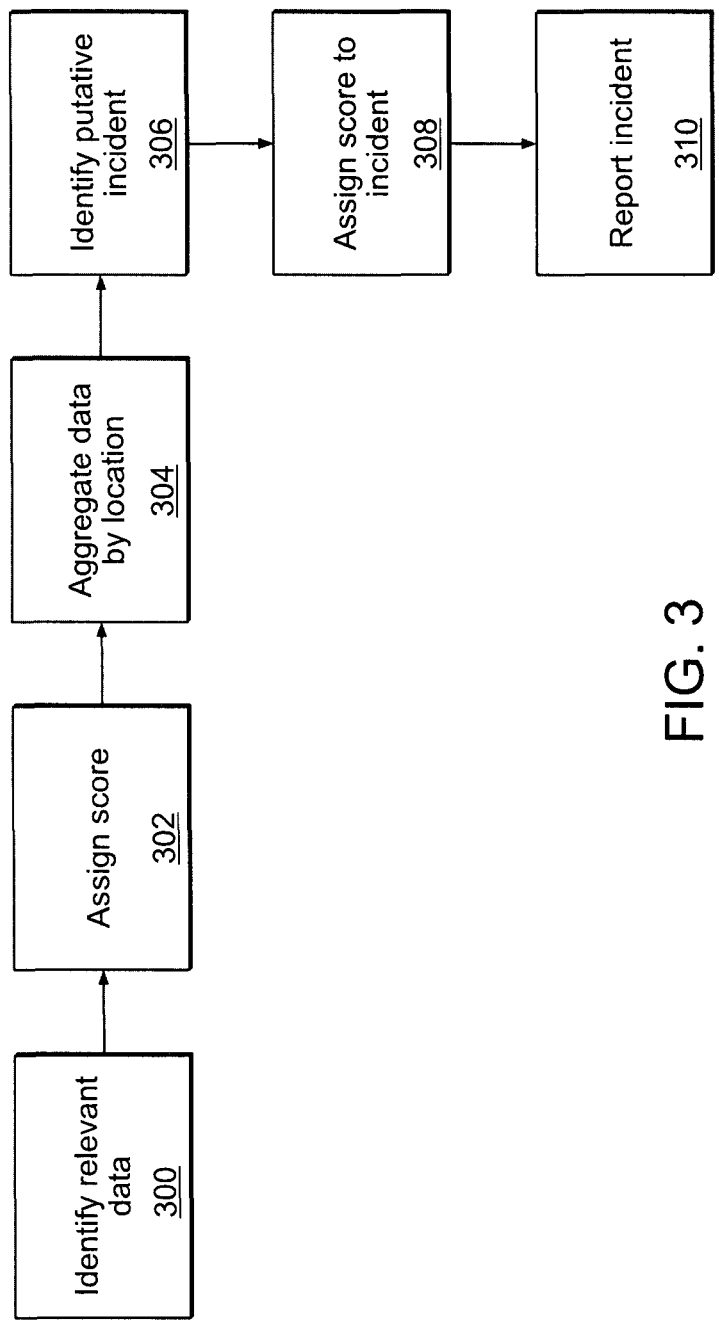
FIG. 3 is a flow chart of the use of a PSAS to identify a putative public-safety incident.

Referring to FIGS. 1 and 3, PSAS 100 evaluates social media posts and other data in real time to infer the occurrence of a public-safety incident. For instance, a number of posts by different users in a similar location may reference the sound of an explosion, the ringing of a fire alarm, or the sight of flames. An analysis of these posts would result in the identification of a possible building fire caused by an explosion.

In general, the scope of the monitoring of PSAS 100 is limited to posts and other data that are relevant to the geographical region within which a specific public safety agency 116 operates. Within this geographical constraint, PSAS 100 identifies individual posts or other data as potentially relevant to public safety (step 300). In some cases, a score is assigned to each data element representative of its likely relevance to public safety (step 302). The aggregation of a number of data elements, all in a similar location (step 304), may cause PSAS 100 to identify a putative public-safety incident (step 306).

When a putative public safety incident is identified, one or more scores are assigned to the incident (step 308) representative of the confidence level that the incident is real, the predicted severity of the incident, or the degree of predicted risk of the incident. The score is based not only on the content of the posts and other data but also on their context. For instance, a large number of relevant Tweets or an increasing frequency of relevant Tweets in the same location raise the relevance scores of each individual Tweet and thus raise the score of the associated incident.

Each 9-1-1 managing entity (e.g., PSAP 116) or public safety agency is able to set its own score threshold. For instance, PSAP 116 may choose to set a low confidence level threshold for severe incidents and a higher threshold for incidents that are predicted to be less severe. When a putative incident has a score that meets or exceeds the threshold for the appropriate PSAP, that incident is delivered into the 9-1-1 network as a call (step 310). The call content may be, for instance, an exemplary social media post, a summary of a series of posts, an incident type and/or location, or a pointer (e.g., a Uniform Resource Indicator (URI)) pointing to a summary of the related posts and data. Alternatively, incidents that meet or exceed the threshold are displayed on a mapping system or other graphical interface utilized by the 9-1-1 managing entity. Alert notifications via SMS, voice message, email, or another means of communication may also be used to warn officials of a putative incident of interest. In some cases, PSAS 100 also suggests dispatch resources based on an analysis of similar previous situations (e.g., other fire emergencies with the same severity and risk scores resulted in the dispatch of four fire trucks, two ambulances, and three police units).

PSAS 100 is not limited to identifying critical emergency incidents. For example, PSAS 100 may notice that an unexpectedly large number of people are posting from Kenmore Square, and that there is no baseball game or other scheduled event that would account for the crowd. The responsible PSAS would be notified of a low-severity incident and could choose to dispatch a police unit to verify that the gathering is peaceful. Public transit problems (e.g., a slow train) and public works issues (e.g., a traffic light on Elm Street is out) can also be identified by PSAS 100.

In some cases, a telecommunicator may be aware of the occurrence of a large event (e.g., a sporting event or a concert) and can instruct PSAS 100 to monitor more carefully the social media posts associated with the area of the event in order to proactively identify any problems.

3.3 Reporting of Results

In some implementations, the results of a PSAS analysis are fed directly into the 9-1-1 call-taking infrastructure as an emergency call. This action introduces items of interest identified by the PSAS into existing emergency response processes. Depending on the specific rule sets and thresholds of the local 9-1-1 entity, the incidents identified by the PSAS may be pushed directly into the 9-1-1 network as a call or may be aggregated in some manner first and a URI pointing to a summary of the incident pushed into the 9-1-1 network. For instance, the National Emergency Number Association (NENA)'s Next Generation 9-1-1 (NG9-1-1) architecture allows non-human initiated events to be presented through a Common Alerting Protocol (CAP) formatted message.

In other implementations, the results of a PSAS analysis can be reported to a PSAP through proactive push alerts (e.g., SMS, emails, CAD incidents) or through reporting tools (e.g., graphical map displays, online reporting, data cubes). The results of the analysis can be delivered (e.g., as an XML document) to other applications (e.g., CAD or GIS systems) or rendered within a PSAS-specific user interface for rapid visual analysis.

In one example, a "heat map" is used to display information obtained from social media and other data sources based on the location and severity of identified or predicted incidents. As the severity (or predicted severity) of an incident increases, the color and/or size of the geographically displayed incident changes accordingly. For instance, as the likelihood and number of first responder units expected to be dispatched to an incident increases, the incident marker displayed on the map may become a darker red or occupy a larger area.

Figure 4A:
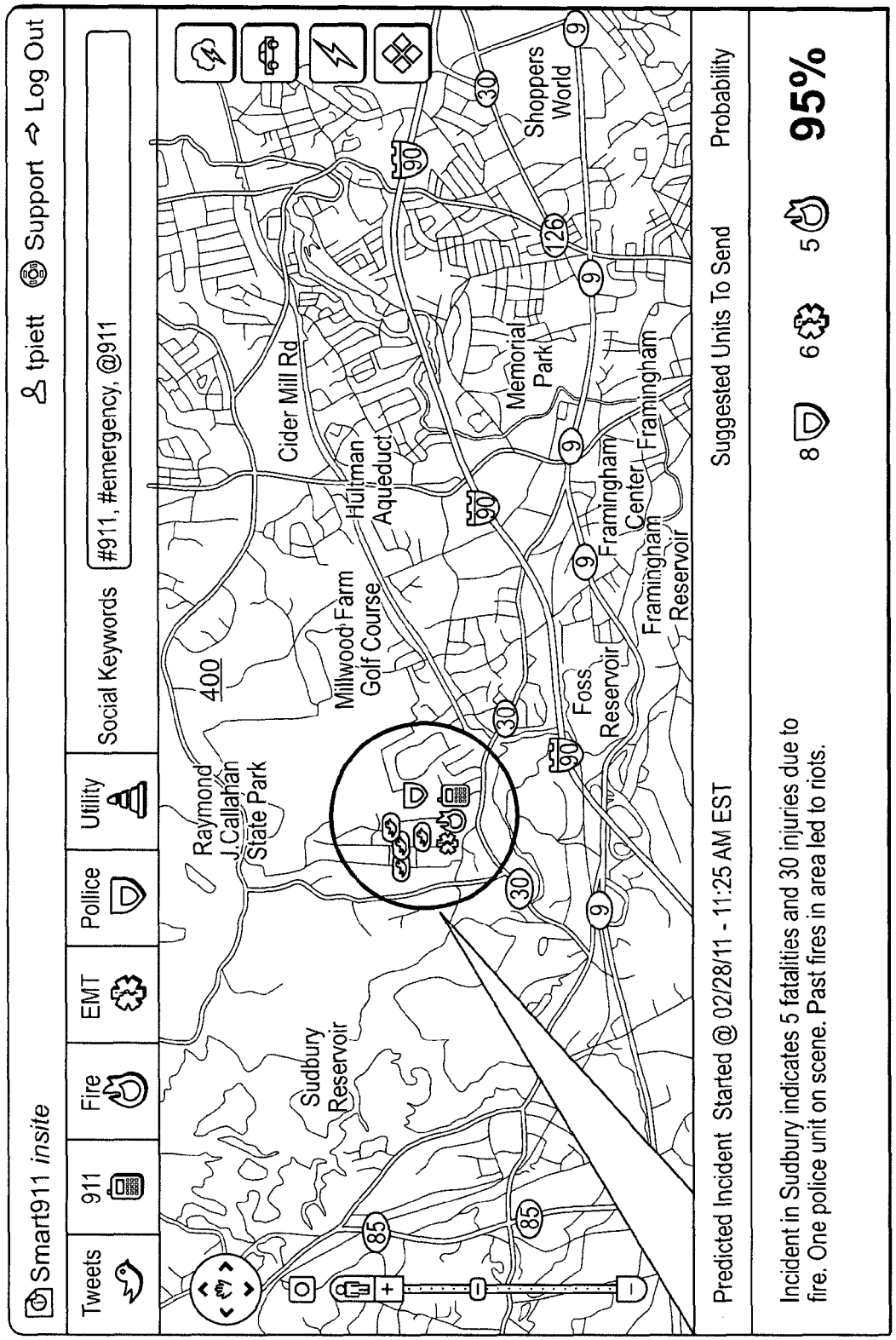

Referring to FIGS. 4A and 4B, in another example, the results of the PSAS analysis are displayed as icons on a map 400. In the illustrated example, a 9-1-1 call, represented by a telephone icon, reported a fire in an apartment unit, represented by a fire icon. A number of social networking posts represented by a bird icon, provide details that inform the PSAP in determining how to respond to the fire. A brief summary indicates the severity (5 fatalities and 30 injuries) of the incident, the current response (one police unit on scene), and a historical perspective (past fires in the area led to riots). Based on the collected data, the likelihood that the fire is a true incident is 95%. A suggestion is then made that the dispatcher send 8 police units, 6 emergency medical technician (EMT) units, and 5 fire trucks. Additionally, an input interface is provided for the PSAP operator to input additional social keywords with which to focus the search.

In other cases, social media information is displayed on a third party graphical information system (GIS). In a public safety context, GIS systems can be stand-alone applications, part of a CAD system, part of the 9-1-1 call-taking system, or integrated into other applications. Using the location and unique identifier of the caller, the PSAP can query (or be updated by) the PSAS, which returns relevant results and instructions for rendering the results. For instance, the PSAS may return 20 relevant TWITTER® posts, with each post assigned a relevancy ranking, the content type(s) associated with the post, and an indicator of which icon should be rendered based on the relevancy and content types.

4 Implementation

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It is to be understood that the foregoing description is intended to illustrate and not to limit the scope of the invention, which is defined by the scope of the appended claims. Other embodiments are within the scope of the following claims.

What is claimed is:

1. A computer-implemented method comprising:
evaluating, using an analysis module of a public-safety analysis system, user-generated content associated with at least one content source;
identifying, using the analysis module of the public-safety analysis system, a putative public-safety incident based at least in part on the evaluation of the user-generated content; and
providing, using an output module of the public-safety analysis system, a representation of the putative public-safety incident to a client of the public-safety analysis system.

2. The method of claim 1, wherein the content source includes at least one of a social networking website, a software application, a blog, and a microblog.

3. The method of claim 1, wherein the user-generated content includes at least one of user-generated text, user-generated images, user-generated audio content, and user-generated videos.

4. The method of claim 1, wherein evaluating the user-generated content includes identifying user-generated content associated with public safety.

5. The method of claim 4, wherein identifying the putative public-safety incident includes identifying the putative public-safety incident based on the identified user-generated content.

6. The method of claim 1, wherein identifying the putative public-safety incident includes identifying the putative public-safety incident based on subject matter of the user-generated content and a location associated with the user-generated content.

7. The method of claim 1, further comprising evaluating metadata associated with the user-generated content.

8. The method of claim 1, further comprising evaluating public-safety data.

9. The method of claim 8, wherein identifying the putative public-safety incident further comprises identifying the putative public-safety incident based further in part on the evaluation of the public-safety data.

10. The method of claim 8, further comprising providing a representation of at least some of the public-safety data to the client of the public-safety analysis system.

11. The method of claim 8, wherein the public-safety data includes data associated with at least one of a source of real-time first responder dispatch data and historical first responder dispatch data.

12. The method of claim 8, wherein the public-safety data includes data related to at least one of weather, traffic, and current events.

13. The method of claim 8, wherein the public-safety data includes location-specific data.

14. The method of claim 8, wherein the public-safety data includes privately accessible public-safety data.

15. The method of claim 1, wherein providing a representation of the putative public-safety incident includes displaying, on a user interface, a representation indicative of a probability that the putative public-safety incident is a true public-safety incident.

16. The method of claim 1, wherein providing a representation of the putative public-safety incident includes displaying, on a user interface, a representation indicative of a severity of the putative public-safety incident.

17. The method of claim 1, further comprising receiving information indicative of a recommended response to the putative public-safety incident.

18. A computer-implemented method comprising:
receiving, at an input module of a public-safety analysis system, a specification of a characteristic of a public-safety incident;
evaluating, using an analysis module of the public-safety analysis system, user-generated content associated with at least one content source, including identifying at least some of the user-generated content as relevant to the public-safety incident based on a comparison between the user-generated content and the characteristic of the public-safety incident; and
providing, using an output interface of the public-safety analysis system, a representation of the public-safety incident to a client of the public-safety analysis system.

19. The method of claim 18, wherein the content source includes at least one of a social networking website, a software application, a blog, and a microblog.

20. The method of claim 18, wherein the user-generated content includes at least one of user-generated text, user-generated images, user-generated audio content, and user-generated videos.

21. The method of claim 18, wherein the characteristic of the public-safety incident includes at least one of a location of the public-safety incident and a time of the public-safety incident.

22. The method of claim 21, wherein evaluating the user-generated content includes at least one of comparing a location associated with the user-generated content and the location of the public-safety incident and comparing a time associated with the user-generated content and a time of the public-safety incident.

23. The method of claim 18, wherein the characteristic of the public-safety incident includes at least one of a category of the public-safety incident and a keyword associated with the public-safety incident.

24. The method of claim 23, wherein evaluating the user-generated content includes comparing a topic of the user-generated content with the category of the public-safety incident.

25. The method of claim 23, wherein evaluating the user-generated content includes identifying user-generated content that includes the keyword of the public-safety incident.

26. The method of claim 18, further comprising evaluating metadata associated with the user-generated content.

27. The method of claim 18, further comprising evaluating public-safety data, including identifying at least some of the public-safety data as relevant to the public-safety incident.

28. The method of claim 27, further comprising providing a representation of at least some of the public-safety data to the client of the public-safety analysis system.

29. The method of claim 27, wherein the public-safety data includes data associated with at least one of a source of real-time first responder dispatch data and historical first responder dispatch data.

30. The method of claim 27, wherein the public-safety data includes data related to at least one of weather, traffic, and current events.

31. The method of claim 27, wherein the public-safety data includes location-specific data.

32. The method of claim 27, wherein the public-safety data includes private public-safety data.

33. The method of claim 18, wherein providing a representation of the public-safety incident includes displaying, on a user interface, a representation of at least some of the user-generated content relevant to the public-safety incident.

34. The method of claim 18, wherein providing a representation of the public-safety incident includes displaying, on a user interface, a representation indicative of at least one of the severity of the public-safety incident and the predicted severity of the public-safety incident.

35. The method of claim 18, further comprising receiving information indicative of a recommended response to the public-safety incident.

36. A non-transitory machine-readable medium that stores executable instructions for causing a machine to:
  identify user-generated content relevant to a public-safety incident, the public safety incident occurring at an incident location, including:
  evaluating user-generated content associated with at least one content source, including identifying a first set of user-generated content associated with the incident location;
  processing the first set of user-generated content against a dictionary of public-safety keywords, including identifying a second set of user-generated content, each item of user-generated content in the second set of user-generated content including at least one of the public-safety keywords;
  for each item of user-generated content in the second set of user-generated content, determining a likelihood that the item of user-generated content is relevant to the public-safety incident based at least in part on a context of the public-safety keyword; and
  assigning a relevance score to each item of user-generated content in the second set of user-generated content, the relevance score indicative of the likelihood that the item of user-generated content is relevant to the public-safety incident.

37. The method of claim 36, wherein determining the likelihood that the item of user-generated content is relevant to the public: safety incident includes identifying negative keywords in the item of user-generated content.

38. The method of claim 36, wherein the likelihood that the item of user-generated content is relevant to the public-safety incident is based at least in part on a likelihood that another item of user-generated content in the second set of user-generated content is relevant to the public-safety incident.

39. The method of claim 36, wherein determining the likelihood that the item of user-generated content is relevant to the public-safety incident includes determining a number of items of user-generated content in the second set of user-generated content that are relevant to the public-safety incident.

40. The method of claim 36, wherein determining the likelihood that the item of user-generated content is relevant to the public-safety incident includes determining a time-related characteristic of the items of user-generated content in the second set of user-generated content.

41. The method of claim 36, further comprising determining a severity of the public-safety incident based on at least one of content of the items of user-generated content in the second set of user-generated content and a time-related characteristic of the items of user-generated content in the second set of user-generated content.

42. The method of claim 36, further comprising forming the dictionary of public-safety keywords.

43. The method of claim 42, wherein forming the dictionary of public-safety keywords includes identifying public-safety keywords based on an analysis of a correlation between a potential keyword and a public-safety incident.

* * * * *